Dec. 30, 1958  B. COOPER ET AL  2,866,600
SONIC VEHICLE COUNTER
Filed May 20, 1954  2 Sheets-Sheet 1
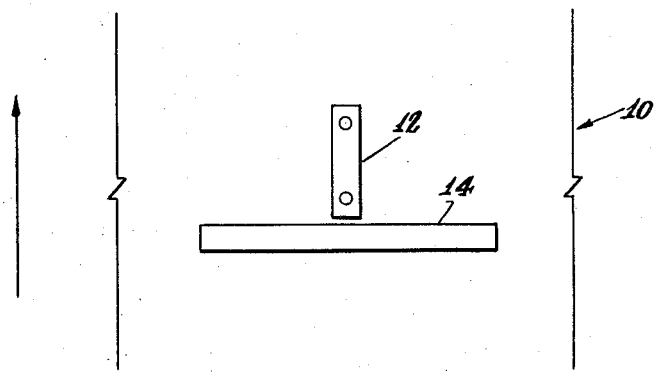
FIG. I.
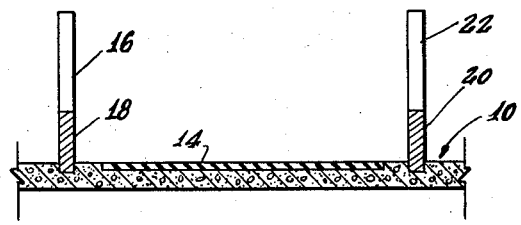
FIG. 2.
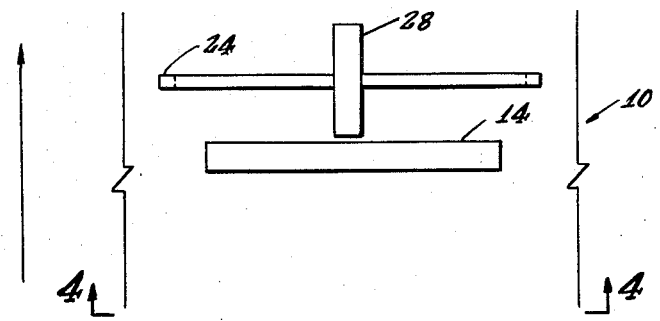
FIG. 3.
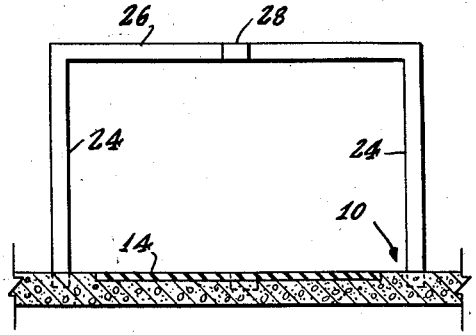
FIG. 4.
INVENTORS.
BENJAMIN COOPER
ARTHUR STERN
BY
J.B.Felshin
ATTORNEY.

Dec. 30, 1958   B. COOPER ET AL   2,866,600
SONIC VEHICLE COUNTER
Filed May 20, 1954   2 Sheets-Sheet 2
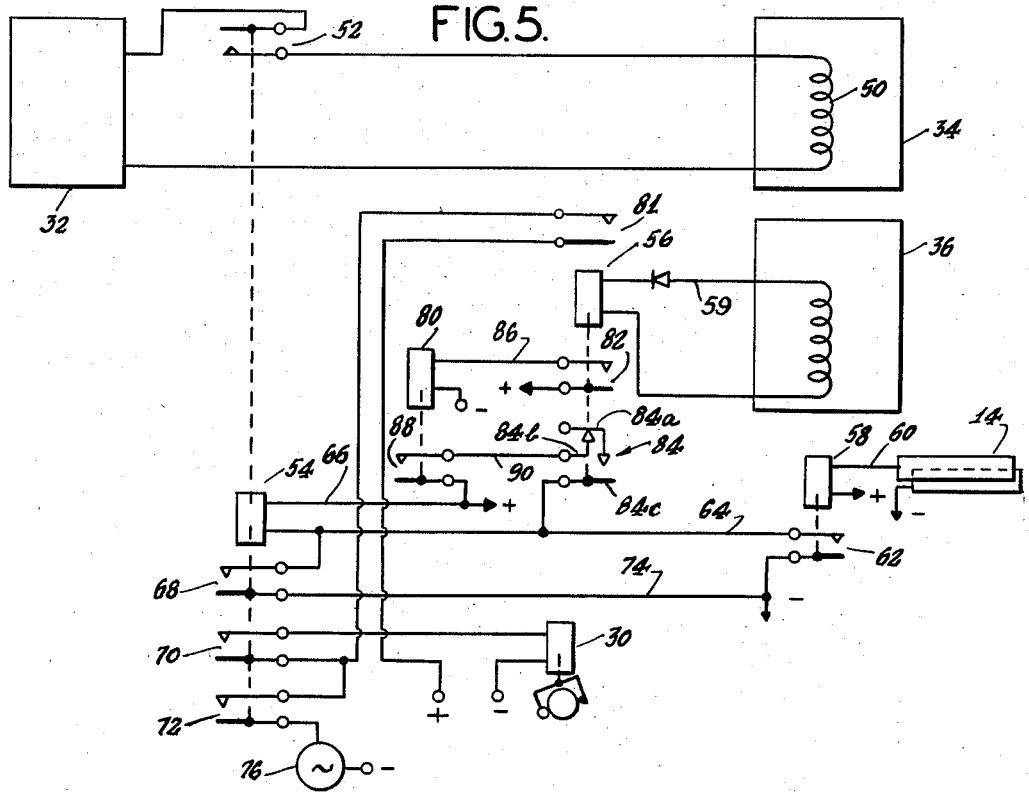
INVENTORS.
BENJAMIN COOPER
ARTHUR STERN
BY
J.B. Felshin
ATTORNEY.

United States Patent Office 2,866,600
Patented Dec. 30, 1958

2,866,600

SONIC VEHICLE COUNTER

Benjamin Cooper, Brooklyn, and Arthur Stern, Bronx, N. Y.; said Stern assignor to said Cooper Application May 20, 1954, Serial No. 431,144

6 Claims. (Cl. 235—99)

This invention relates generally to toll checking systems and more particularly to a toll checking system having novel means to count the passage of vehicles over a predetermined portion of a roadway. Heretofore, treadle switch devices have been embedded in the roadway transversely thereof to be actuated by the wheels of a vehicle rolling thereover. Counting devices controlled by the treadle switches recorded the axle count of vehicles traversing the treadle switches. This system does not differentiate between vehicles in that some vehicles may have more than two axles. Accordingly, it is difficult to distinguish the total vehicle count from the total axle count recorded on the counting means.

It is a principal object of the present invention to provide a vehicle counting system that will accurately count each vehicle irrespective of the number of axles thereon, as a single vehicle.

The present invention provides a system that includes a novel detector which senses or detects the presence of a vehicle and operates or controls counting means accordingly. Therefore, it is another object of the invention to provide a system of the class described, having a sonic type detector for controlling the vehicle counting means.

To insure that the vehicle counting means will only record vehicular passage and thereby prevent erroneous counts resulting from the introduction of non-vehicular mass that may have inadvertently entered the detection field of the sonic type detector, there is provided triggering means which are responsive only to the passage of a vehicle.

Therefore, still another object of the invention resides in the provision of a system of the class described having vehicular responsive means to initiate a counting operation by the sonic type detector.

Other ancillary objects will be, in part, hereinafter apparent and, in part, hereinafter pointed out.

In the drawings:

Figure 1 is a plan of a roadway illustrating a possible arrangement of the detecting device and the treadle.

Figure 2 is a cross-sectioned elevational view of a roadway illustrating a further arrangement of the detecting device and treadle.

Figure 3 is a plan of a roadway illustrating still another arrangement of a detecting device and treadle.

Figure 4 is a cross-section taken along line 4—4 of Figure 3.

Figure 5 is a schematic wiring diagram of the circuitry utilized with the sonic detecting device and treadle to effect a count.

Figure 6 is an enlarged fragmentary cross-section view of a sonic transducer embedded in a roadway.

Figure 7 is a cross-section detail illustrating a plurality of transducers and the interconnecting wave pattern emitted therefrom, embedded in a roadway in detecting relation with the treadle.

Referring to the drawings in detail, 10 generally designates a roadway having a transducer assembly 12 embedded therein in perpendicular relation to a treadle 14 also embedded therein. As shown in Figure 1, the transmitter and receiver portion of the sonic detector is located within the framework 12 in a unitary manner which is embedded in roadway 10 to a position wherein the topside thereof is parallel to and flush with the plane of the roadway. Treadle 14 is similarly embedded relative to the plan of the roadway and is further disposed so that the wheels of a vehicle traversing said roadway must necessarily roll over said treadle.

The arrangement shown in Figure 2 differs in the disposition of the transmitter and receiver elements of the sonic detector. It is proposed that the transmitter portion 16 be mounted in a stanchion 18 that is disposed on one side of roadway 10. A stanchion 20 disposed on the opposite side of roadway 10 to that occupied by stanchion 18 supports receiver portion 22 of the detecting device.

In the arrangement shown in Figures 3 and 4, it is proposed that a pair of stanchions 24 be disposed in vertical relation over the roadway 10 and further interconnected at their upper terminals with a bridge member 26. Centrally disposed in a direction transverse to the axis of bridge member 26 is the detecting device 28. Detecting device 28 is of the type that incorporates the transmitter and receiver as a unit.

The actual circuitry of the sonic device per se forms no part of the present invention in that conventional sonic devices are employed, that is, in the embodiment illustrated in Figures 1, 3, and 4, the transmitter and receiver is located in a housing along with the receiver. A curtain of sound radiates from the transducer in timed relation to provide a sound wave pattern substantially as shown in Figure 6. It is conventional in sonic devices such as this to provide that the sound frequency is above the audible range normally heard by human ears. The presence of a vehicle or an object in this wave pattern reflects an echo that is received by the receiver in timed relation to the transmission. The presence of an echo may be utilized as hereinafter described to provide a control.

As shown in Figure 2, the transmitter and receiver are spaced one from the other wherein the presence of an object therebetween will reduce the intensity of the signal as it is received at the receiver. This reduction in signal intensity may be utilized as a means of control for purposes hereinafter appearing.

Referring to Figure 5, there is shown a schematic wiring diagram of the circuit associated with the components illustrated in the other figures for controlling a counter 30. It will be understood that the oscillator 32, transmitter 34, and receiver 36 are conventional in design and are similar to the sonic devices utilized in depth finding for marine purposes, that is, a series of pulses are transmitted and such pulses are reflected back to the receiver and in accordance with the time lag between the transmission and the receiving of the pulses, a distance may be measured. In the present invention applicants are not concerned with measuring distance but utilize the sonic type transmission as a means for detecting an object in the field of radiation of the antenna or transducers. It is proposed that a wave pattern extending several feet above the bed of a roadway will be emitted from a transducer 40 such as shown in Figure 6. Transducer 40 is embedded in fixed relation in a supporting plastic-like substance such as 42 which is mounted in a frame 44 embedded in roadway 10. The treadle 14 is not shown in this figure but is disposed adjacent to the transducer 40. The antenna of the receiver 28 may be disposed to receive the signal emitter from transducer 40 or it may be embedded in the roadway adjacent to the transducer such as shown in 28a.

In a like manner, a plurality of transducers 40 may be embedded in the roadway along with adjacent receivers 28a such as shown in Figure 7. This plurality is proposed so that the field of detection may be extended in size for purposes hereinafter appearing. The diagram illustrated in Figure 5 appertains to the principle wherein the receiver is disposed adjacent to the transducer so that only reflected echos will be received, such as would be the case when an object is present in the wave pattern of the signal emitted by the transducer. Oscillator 32 is adapted to generate a sonic frequency above that normally audible to human ears. Oscillator 32 may be considered to be continuously in operation for the purpose of the present invention. Oscillar 32 is coupled to transmitter 34 through a coil 50 which is controlled by a pair of contacts 52. Contacts 52 are associated with a relay 54 hereinafter described in detail. Contacts 52 are of the open type and when opened, transmitter 34 does not emit a signal. However, when closed, transmitter 34 does emit a signal having the frequency of the oscillator 32. Analogously, receiver amplifier 36 is generally considered to be operative at all times and included in the plate circut of the audio amplification section thereof is a plate current relay designated as 56. The operation of plate current type relays is well known to those skilled in the electronic art and perform in such a manner so that when a signal is received by receiver 36, plate current flows in the circuit shown as 59 which energizes relay 56. In the absence of a signal in receiver 36, plate current will not flow in circuit 59 and relay 56 will remain de-energized. Thus, it may be understood that the presence of an object in the radiation field of the transducer associated with transmitter 34 will reflect the signal emitting therefrom onto the receiver 36 and, accordingly, cause relay 56 to become energized. Upon the object departing from the field of radiation, no signal will be received by receiver 36 and relay 56 will de-energize to effect the completion of a count on counter 30, providing, however, that treadle 14 has been actuated by the wheels of a vehicle rolling thereover. Relay 58, associated with treadle 14, is energized upon the actuation of said treadle. A simple circuit actuates relay 58 and this may be traced as follows: From a positive source of potential to one terminal of the coil 58 through said coil and over conductor 60 to one contact of the normally open contacts in treadle 14, from the other contact of treadle 14, when said contacts are closed, to a source of negative potential. Thus, the closing of the contacts in treadle 14 energize relay 58. Normally open contacts 62, associated with relay 58, are closed upon the energization thereof. Contacts 62, when closed, complete a circuit that energizes relay 54. This circuit may be traced as follows: From a source of negative potential through closed contacts 62, over conductor 64 to one terminal of the coil of relay 54. The other terminal of the coil of relay 54 is connected by conductor 66 to a source of positive potential. Thus, the front wheels of the vehicle rolling over treadle 14 results in the energizing of relay 54. Normally open contacts 52, 68, 70 and 72 associated with relay 54 then close. Contacts 52, when closed, couple oscillator 32 to transmitter 34 and energize said transmitter to effect the emission of a signal.

Contacts 68 provide a holding circuit for relay 54 through a circuit which exists from a negative source of potential over conductor 74 through closed contact 68 to the negative terminal of the coil of relay 54. Thus, even though the front wheels of the vehicle traversing treadle 14 roll off said treadle and the contacts therein open, relay 54 will remain energized. Contact 70 associated with relay 54 when closed prepare a circuit for energizing counter 30. Counter 30 is conventional and similar to the electro-magnetic type that is completely disclosed in Patent 2,185,724, issued to Benjamin Cooper on January 2, 1940.

Contacts 72 may be utilized to control an auxiliary circuit such as an overhead indicator, not shown, or a lamp 76 which may be employed to indicate that a count is being recorded.

Means are provided to control counter 30 so that only a single count will be recorded thereon for each vehicle that traverses the treadle and enters the sonic field irrespective of the number of axles on the vehicle that may roll over the treadle. Directed toward this end, there is provided a relay 80. Relay 80 operates in conjunction with relay 56. As previously set forth, relay 56 energizes upon the vehicle entering the sonic field and controlling the receiver 36 accordingly. Associated with relay 56 are normally open contacts 81, normally open contacts 82 and a group of make-before-break contacts designated as 84. Normally open contacts 81 are closed when relay 56 energizes to complete the energizing circuit for counter 30. As shown in Figure 5, the counter energizing circuit has contacts 70 and 81 in series therewith. Thus, the closing of contact 70, as a result of the actuation of the treadle 14, merely prepares the counter energizing circuit whereas the subsequent closing of contacts 81 completes the energizing circuit which energizes counter 30. Controlling relays 54 and 56 remain energized until the vehicle being counted has departed from the sonic field. Normally open contacts 82 are closed upon the energization of relay 56 to complete a circuit which energizes relay 80. This circuit is traced from a source of positive potential through the closed contacts 82, over conductor 86 to one terminal of the coil of relay 80. The other terminal of the coil of relay 80 is connected to a source of negative potential. Relay 80 has associated therewith a pair of normally open contacts 88 which are adapted to be losed when relay 80 is energized. Relay 80 is so designed to be of the type conventionally known as slow-to-operate and slow-to-release, i. e., when energized, a slight time delay occurs before contacts 88 are closed. In a similar manner, when relay 80 is de-energized, a slight time delay occurs before contacts 88 open. This time lag is provided for a purpose now to be described. As previously set forth, when treadle 14 is actuated, relay 58 is energized and relay 54 is subsequently energized thereby resulting in energization of counter 30. Relay 54 is provided with its own holding circuit, therefore, when the wheels roll over the treadle, relay 54 remains energized. As soon as the vehicle enters the sonic field, relay 56 becomes energized. Contacts 82 close immediately; however, relay 80 does not energize instantaneously because of the time lag construction. The make-before-break group of contacts 84 are of the type where two contacts, 84a and 84b are normally closed. Upon the energizing of relay 56 contact 84c engages contact 84a and opens contacts 84a and 84b. Contact 84b is connected by conductor 90 to the neutral contact of contacts 88. The other contact of contacts 88 is connected to a source of positive potential. Upon the initial energizing of relay 56, it will be obvious that a shorted condition would exist through contacts 84 and contacts 88 across relay 54. However, the slow-to-operate feature of relay 80 permits the switch over in contact group 84 before contacts 88 are made. Therefore, relay 54 remains energized while relay 56 is energized. As soon as the vehicle leaves the sonic field which would obviously be defined by the rear bumper or the last portion of the vehicle to pass through it relay 56 will de-energize and permit contacts 84 to resume their initial position wherein contact 84b will engage contact 84a prior to contacts 84a and 84c separating. This momentary engagement will permit positive potential to flow through the closed contacts 88, contact group 84 to the negative terminal of the coil of relay 54. A momentary short on relay 54 will de-energize said relay and contacts 68, 70 and 72 associated therewith will open. Contacts 88, associated with relay 80, will then open since the time lag will have occurred.

The de-energizing of relay 56 permits contacts 81 to open thereby interrupting the energizing circuit for counter 30. The de-energizing of counter 30 conditions said counter for the recording of the succeeding vehicle.

Thus, it will be obvious that the accidental closing of the contacts in treadle 14 per se will not effect a count nor will the accidental presence of a foreign object in the sonic field per se effect a count.

Accordingly, it is readily apparent that a vehicle upon rolling over the treadle will initiate a counting operation and concurrently therewith activate the sonic transmitter which will immediately detect the presence of the vehicle in the pattern or field of radiation of the sonic detector. The presence of the vehicle in said field effectively holds the counting operation in a suspended status, i. e., a count operation cannot be completed while the vehicle is in the detecting field. As soon the vehicle has left the field of radiation, the sonic detector responds to permit the completion of a counting operation. Therefore, the inadvertent entry of a foreign object such as a human being or an animal, into the field of radiation will not produce a count since it would have been necessary for the foreign object to first actuate the treadle to make the sonic detector effective.

Further, it will be noted that the mass of a vehicle will hold the counter in its initiated position until the vehicle has completely passed through the field of detection thereby accurately insuring that each count on the counter represents a single vehicle. Even in the instance of a vehicle drawing a trailer, the towing bar interconnecting the vehicle in the trailer is sufficient to maintain the counter in suspended operation.

Thus, it is apparent that there has been provided a device in which the several objects of the invention are achieved and which is well adapted to meet the conditions of practical use.

While there has been shown and described several embodiments of the invention, it is to be understood that modifications and changes might be made without departing from the scope of the present invention except as limited by the following claims:

The invention claimed is:

1. In combination, a treadle switch adapted to be actuated by the wheels of a vehicle rolling thereover, sonic detecting means adjacent to said treadle switch and adapted to sense the presence of a vehicle after it has rolled over said treadle switch, relay means controlled by said treadle switch, switch means associated with said relay means and controlled thereby, said switch means being adapted to energize said sonic detecting means upon the energization of said relay means, means controlled by said sonic detecting means to maintain said relay means in energized condition while the vehicle is detected by said sonic detecting means, counting means, and means responsive to the actuation of said switch means and the detecting of the vehicle by said sonic detecting means to actuate said counting means.

2. In combination, a treadle switch adapted to be actuated by the wheels of a vehicle rolling thereover, sonic detecting means adjacent to said treadle switch and adapted to sense the presence of a vehicle after it has rolled over said treadle switch, relay means controlled by said treadle switch, switch means associated with said relay means and controlled thereby, said switch means being adapted to energize said sonic detecting means upon the energization of said relay means, means controlled by said sonic detecting means to maintain said relay means in energized condition while the vehicle is detected by said sonic detecting means, counting means, and means responsive to the actuation of said switch means and the detecting of the vehicle by said sonic detecting means to actuate said counting means, and means controlled by said sonic detecting means to de-actuate said counting means upon the departure of the vehicle from said sonic detecting means.

3. In combination, means operated by sensing the wheels of a vehicle passing a predetermined location, sonic means operable to sense the passage of the vehicle past said location, means responsive to the operation of said wheel sensing means to operate said sonic sensing means, and means responsive to the operation of both the wheel sensing means and the sonic means for counting vehicles passing said location.

4. In combination, means operated by sensing the wheels of a vehicle passing a predetermined location, sonic means operable to sense the passage of the vehicle past said location, means responsive to the operation of said wheel sensing means to operate said sonic sensing means, and means responsive to the simultaneous operation of both the wheel sensing means and the sonic means for counting vehicles passing said location.

5. In combination, means operated by sensing the wheels of a vehicle passing a predetermined location, sonic means operable to sense the passage of the vehicle past said location, means responsive to the operation of said wheel sensing means to operate said sonic sensing means, means responsive to the operation of both the wheel sensing means and the sonic means for counting vehicles passing said location, and means for limiting the counting means to count a single count for each vehicle irrespective of the number of wheels on each vehicle.

6. In combination, means operated by sensing the wheels of a vehicle passing a predetermined location, sonic means operable to sense the passage of a vehicle passed said location, means responsive to the operation of said wheel sensing means to operate said sonic sensing means, holding means operable upon the operation of said wheel sensing means to maintain said sonic sensing means operated, counting means, means responsive to the operation of both the wheel sensing means and sonic means to actuate said counting means, and means to release said operated holding mens when said sonic sensing means no longer senses the presence of the vehicle at said location.

References Cited in the file of this patent

UNITED STATES PATENTS

| | | |
|---|---|---|
| 1,827,786 | Gilson | Oct. 20, 1931 |
| 1,982,341 | Hitchcock | Nov. 29, 1934 |
| 1,998,132 | Geffckin | Apr. 18, 1935 |
| 2,082,941 | Burnside | June 8, 1937 |
| 2,287,090 | Cooper | June 30, 1942 |
| 2,497,149 | Berdis et al. | Feb. 14, 1950 |